(12) United States Patent
Cao (10) Patent No.: US 11,470,531 B2
(45) Date of Patent: Oct. 11, 2022

(54) SYSTEM AND METHOD FOR AUTOMATICALLY SWITCHING REAL-TIME COMMUNICATION DEVICE TO NEW BASIC SERVICE SET

(71) Applicant: Agora Lab, Inc., Santa Clara, CA (US)

(72) Inventor: Yue Cao, Shanghai (CN)

(73) Assignee: Agora Lab, Inc., Santa Clara, CA (US)

( * ) Notice: Subject to any disclaimer, the term of this patent is extended or adjusted under 35 U.S.C. 154(b) by 280 days.

(21) Appl. No.: 16/926,855

(22) Filed: Jul. 13, 2020

(65) Prior Publication Data

US 2022/0014995 A1    Jan. 13, 2022

(51) Int. Cl.
*H04W 36/30* (2009.01)
*H04W 36/22* (2009.01)
*H04W 24/08* (2009.01)
*H04W 76/10* (2018.01)

(52) U.S. Cl.
CPC ........... *H04W 36/30* (2013.01); *H04W 24/08* (2013.01); *H04W 36/22* (2013.01); *H04W 76/10* (2018.02)

(58) Field of Classification Search
CPC ..... H04W 36/30; H04W 76/10; H04W 24/08; H04W 36/22
See application file for complete search history.

(56) References Cited

U.S. PATENT DOCUMENTS

| | | | |
|---|---|---|---|
| 9,292,414 B2 | 3/2016 | Kiel et al. | |
| 9,306,829 B1 | 4/2016 | Boyle et al. | |
| 9,320,019 B2 | 4/2016 | Gallagher et al. | |
| 9,805,202 B2 | 10/2017 | Medeiros et al. | |
| 2003/0040319 A1* | 2/2003 | Hansen | H04W 16/10 455/450 |
| 2014/0307571 A1* | 10/2014 | Herzen | H04W 24/02 370/252 |
| 2016/0112166 A1 | 11/2016 | Hundal et al. | |
| 2016/0373995 A1* | 12/2016 | Kinthada Venkata | H04B 17/373 |

* cited by examiner

*Primary Examiner* — Ricky Q Ngo
*Assistant Examiner* — Stephen N Steiner
(74) *Attorney, Agent, or Firm* — Depeng Bi; The Law Offices of Konrad Sherinian, LLC (57) ABSTRACT

An improved Wi-Fi access point dynamically determines the interference level of each channel. The access point determines that a new channel is better suited to serve an RTC/RTE application over the present channel based on the interference levels and a set of interference measure thresholds. The access point automatically creates a new basic service set on the new channel and associates the RTC/RTE device running the RTC/RTE application with the new basic service set. The access point further refuses to associate the RTC/RTE device with the previous channel when the interference level on the new channel remains low based on a second set of interference measure thresholds. In addition, the access point allows additional RTC/RTE devices to join the new basic service set with the first RTC/RTE device when the interference level on the new channel remains low based on the second set of interference measure thresholds.

16 Claims, 7 Drawing Sheets

SYSTEM AND METHOD FOR AUTOMATICALLY SWITCHING REAL-TIME COMMUNICATION DEVICE TO NEW BASIC SERVICE SET

CROSS REFERENCE TO RELATED APPLICATIONS

This application is related to U.S. patent application Ser. No. 16/926,871, entitled "SYSTEM AND METHOD FOR CLASSIFYING NETWORK DATA PACKETS WITH PROVIDED CLASSIFIER IDENTIFIERS," filed Jul. 13, 2020, assigned to Agora Lab, Inc. of Santa Clara, Calif., and which is hereby incorporated by reference. This application is also related to U.S. patent application Ser. No. 16/922, 093, entitled "SYSTEM AND METHOD FOR PROVIDING UPSTREAM DIRECTIVES BASED ON UPSTREAM SIGNAL QUALITY' OF WIRELESS NETWORK IN REAL-TIME COMMUNICATION," filed Jul. 7, 2020, assigned to Agora Lab, Inc. of Santa Clara, Calif. and which is hereby incorporated by reference.

FIELD OF THE DISCLOSURE

The present invention generally relates to wireless communication, and more particularly relates to real-time communication and real-time engagement over a wireless network. More particularly still, the present disclosure relates to a system and method for automatically switching a wireless real-time communication device and real-time engagement device to a new and less congested basic service set.

DESCRIPTION OF BACKGROUND

Wi-Fi is a family of wireless networking technologies that are based on the IEEE 802.11 family of technical standards. Wi-Fi (also referred to herein as WiFi) technologies are commonly used for local area networking of electronic devices and Internet access. The electronic devices can be smartphones, tablet computers, laptop computers, desktop computers, and other types of devices. A Wi-Fi access point creates a local wireless network, and is operatively coupled to the Internet via, for example, a broadband access device (such as a broadband modem). The broadband access device bridges the communication between the Wi-Fi access point and the Internet. Electronic devices access the Wi-Fi access point to access the Internet and communicate with each other. The Wi-Fi access point could also be a Wi-Fi hotspot. In such a case, the Wi-Fi hotspot can be created from, for example, a wireless access point, or a smartphone that accesses a public cellular network for accessing the Internet. The Wi-Fi hotspot can be provided by, for example, a public cellular network. As used herein, Wi-Fi access points and Wi-Fi hotspots are collectively referred to as Wi-Fi access points.

Electronic devices access the Wi-Fi network for many purposes. For instance, a mobile device (such as a smartphone, a tablet computer or a laptop computer) or a desktop computer runs a real-time communication application or real-time engagement application for text, audio, voice, video or both voice and video communication, such as instant messaging, voice over IP ("VoIP"), video teleconferencing, and online virtual meeting. Real-time communication ("RTC") and Real-time Engagement ("RTE") (collectively referred to herein as "RTC/RTE") are the near simultaneous exchange of information over any type of telecommunications service with negligible latency. The immediacy of RTC/RTE is critically important for users. RTC/RTE software applications can be built in compliance with, for example, the Web Real-Time Communication ("WebRTC") framework.

An RTC/RTE software application running on a wirelessly networked device sends data (such as voice data, video data, text data, etc.) from the electronic device on which it is running to other electronic devices or servers. The data is sent from the electronic device to the Wi-Fi access point in the form of wireless signals, and referred to herein as upstream. The RTC/RTE software application also receives data (such as voice data, video data, text data, etc.) from other electronic devices or servers. The data is sent from the Wi-Fi access point to the electronic device in the form of wireless signals as well, and referred to herein as downstream. Downstream is received by the electronic device from the Wi-Fi access point while upstream is transmitted by the electronic device to the Wi-Fi access point.

The quality of the Wi-Fi access point's Wi-Fi signal can vary depending on the relative location, interference from other devices, the number of electronic devices on a particular wireless channel, conditions under which a mobile device accesses the Wi-Fi access point, and other factors. When the quality of the Wi-Fi signal is lower, the quality of users' experience ("QoE") of the RTC/RTE application becomes lower. QoE can be described and measured by a number of parameters, such as video resolution, choppy video time, video sharpness (also known as video clarity) and choppy audio time, latency, etc.

Accordingly, it is desirable for an improved Wi-Fi access point and method to dynamically detect the situation where the interference in a wireless channel is below a threshold, and create a new basic service set ("BSS") on a different channel with much less interference. The improved Wi-Fi access point automatically associates the RTC/RTE device running the RTC/RTE software application to the new BSS and refuses it to associate again with the congested BSS while the new BSS provides satisfactory performance. The improved Wi-Fi access point may also associate additional RTC/RTE devices with the new BSS.

SUMMARY OF THE DISCLOSURE

Generally speaking, pursuant to the various embodiments, the present disclosure provides a method for automatically switching an RTC/RTE device to associate with a new basic service set. The method is performed by a wireless access point and includes receiving a first association request from a first RTC/RTE device for associating the first RTC/RTE device with a first BSS on a first wireless channel; in response to the first association request, associating the first RTC/RTE device with the first BSS on the first wireless channel; creating a socket with a predetermined port on an IP address of the wireless access point; receiving a request for connecting to the socket from the first RTC/RTE device; establishing a connection with the first RTC/RTE device over the socket; scanning a set of wireless channels to determine a first interference measure for each channel within the set of wireless channels, thus forming a first set of interference measures, the set of wireless channels including the first wireless channel; determining that the first interference measure of a second wireless channel within the set of wireless channels is above a first threshold within a first set of interference measure thresholds and the first interference measure of the first wireless channel is below a second threshold within the first set of interference measure thresholds; creating a second BSS on the second wireless channel; disassociating the first RTC/RTE device from the first BSS; receiving a second association request from the first RTC/RTE device to associate with the second BSS; and in response to the second association request, associating the first RTC/RTE device with the second BSS. The wireless access point is a Wi-Fi access point and the predetermined port is a TCP port or a UDP port. Each interference measure within the set of interference measures is a SNR value. The first threshold within the first set of interference measure thresholds is different from the second threshold within the first set of interference measure thresholds. The method further includes binding the socket to the IP address, and listening to the socket for connection requests from RTC/RTE devices including the first RTC/RTE device. The method further includes receiving a third association request from the first RTC/RTE device for associating the first RTC/RTE device with the first BSS on the first wireless channel after the first RTC/RTE device is disassociated from the first BSS and before the first RTC/RTE device requests to associate with the second BSS; and in response to the third association request, refusing associating the first RTC/RTE device with the first BSS on the first wireless channel. The method of claim 6 further includes scanning the set of wireless channels to determine a second interference measure for each channel within the set of wireless channels, thus forming a second set of interference measures; determining that the second interference measure of the second channel is above a first threshold within a second set of interference measure thresholds while the first RTC/RTE device is associated with the second BSS; receiving a fourth association request from a second RTC/RTE device to associate with the first BSS; in response to the fourth association request, refusing to associate the second RTC/RTE device with the first BSS; receiving a fifth association request from a second RTC/RTE device to associate with the second BSS while the first RTC/RTE device is associated with the second BSS; and, in response to the fifth association request, associating the second RTC/RTE device with the second BSS while the first RTC/RTE device is associated with the second BSS.

Further in accordance with the present teachings is an improved wireless access point. The improved wireless access point includes a processing unit; a memory operatively coupled to the processing unit; a set of LED indicators operatively coupled to the processing unit; a wireless network module operatively coupled to the processing unit; a power module operatively coupled to the processing unit; a wired wide area network module operatively coupled to the processing unit; an operating system executed by the processing unit; and a wireless access point application running over the operating system. The wireless access point application is adapted to receive a first association request from a first RTC/RTE device for associating the first RTC/RTE device with a first BSS on a first wireless channel; in response to the first association request, associate the first RTC/RTE device with the first BSS on the first wireless channel; create a socket with a predetermined port on an IP address of the wireless access point; receive a request for connecting to the socket from the first RTC/RTE device; establish a connection with the first RTC/RTE device over the socket; scan a set of wireless channels to determine a first interference measure for each channel within the set of wireless channels, thus forming a first set of interference measures, the set of wireless channels including the first wireless channel; determine that the first interference measure of a second wireless channel within the set of wireless channels is above a first threshold within a first set of interference measure thresholds and the first interference measure of the first wireless channel is below a second threshold within the first set of interference measure thresholds; create a second BSS on the second wireless channel; disassociate the first RTC/RTE device from the first BSS; receive a request from the first RTC/RTE device to associate with the second BSS; and in response to the second association request, associating the first RTC/RTE device with the second BSS. The wireless access point is a Wi-Fi access point and the predetermined port is a TCP port or a UDP port. Each interference measure within the set of interference measures is a SNR value. The first threshold within the first set of interference measure thresholds is different from the second threshold within the first set of interference measure thresholds. The wireless access point application is further adapted to bind the socket to the IP address; and listen to the socket for connection requests from RTC/RTE devices including the first RTC/RTE device. The wireless access point application is further adapted to receive a third association request from the first RTC/RTE device for associating the first RTC/RTE device with the first BSS on the first wireless channel after the first RTC/RTE device is disassociated from the first BSS and before the first RTC/RTE device requests to associate with the second BSS; and in response to the third association request, refuse associating the first RTC/RTE device with the first BSS on the first wireless channel. The wireless access point application is further adapted to scan the set of wireless channels to determine a second interference measure for each channel within the set of wireless channels, thus forming a second set of interference measures; determine that the second interference measure of the second channel is above a first threshold within a second set of interference measure thresholds while the first RTC/RTE device is associated with the second BSS; disassociate a second RTC/RTE device from the first BSS; receive a fourth association request from a second RTC/RTE device to associate with the first BSS; in response to the fourth association request, refuse to associate the second RTC/RTE device with the first BSS; receive a fifth association request from a second RTC/RTE device to associate with the second BSS while the first RTC/RTE device is associated with the second BSS; and, in response to the fifth association request, associate the second RTC/RTE device with the second BSS while the first RTC/RTE device is associated with the second BSS.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Although the characteristic features of this disclosure will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

A person of ordinary skills in the art will appreciate that elements of the figures above are illustrated for simplicity and clarity, and are not necessarily drawn to scale. The dimensions of some elements in the figures may have been exaggerated relative to other elements to help understanding of the present teachings. Furthermore, a particular order in which certain elements, parts, components, modules, steps, actions, events and/or processes are described or illustrated may not be actually required. A person of ordinary skill in the art will appreciate that, for the purpose of simplicity and clarity of illustration, some commonly known and well-understood elements that are useful and/or necessary in a commercially feasible embodiment may not be depicted in order to provide a clear view of various embodiments in accordance with the present teachings.

DETAILED DESCRIPTION

Figure 1:
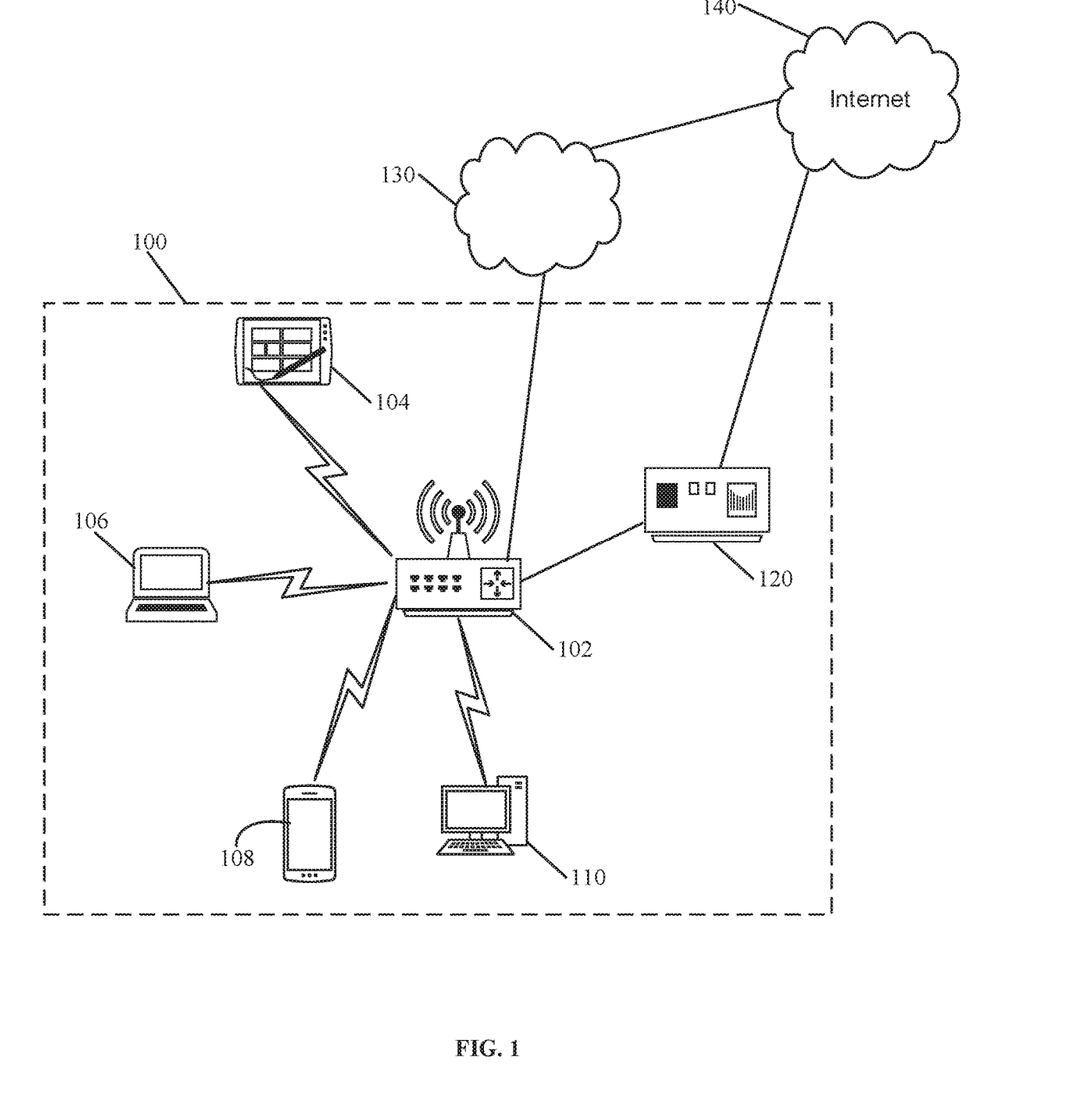
FIG. 1 is an illustrative block diagram of a Wi-Fi wireless network in accordance with the teachings of this disclosure.

Turning to the Figures and to FIG. 1 in particular, an illustrative block diagram of a wireless communication network is shown and generally indicated at 100. The Wi-Fi network 100 includes a Wi-Fi access point 120 connecting to the Internet 140 via the broadband access device 120 or a public cellular network 130, and a set of electronic devices, such as the tablet computer 104, the laptop computer 106, the smartphone 108 and the desktop computer 110. The electronic devices 104-108 are mobile devices. The devices 104-110 each run an improved RTC/RTE software application while the Wi-Fi access point 102 runs an improved Wi-Fi access point software application.

Figure 2:
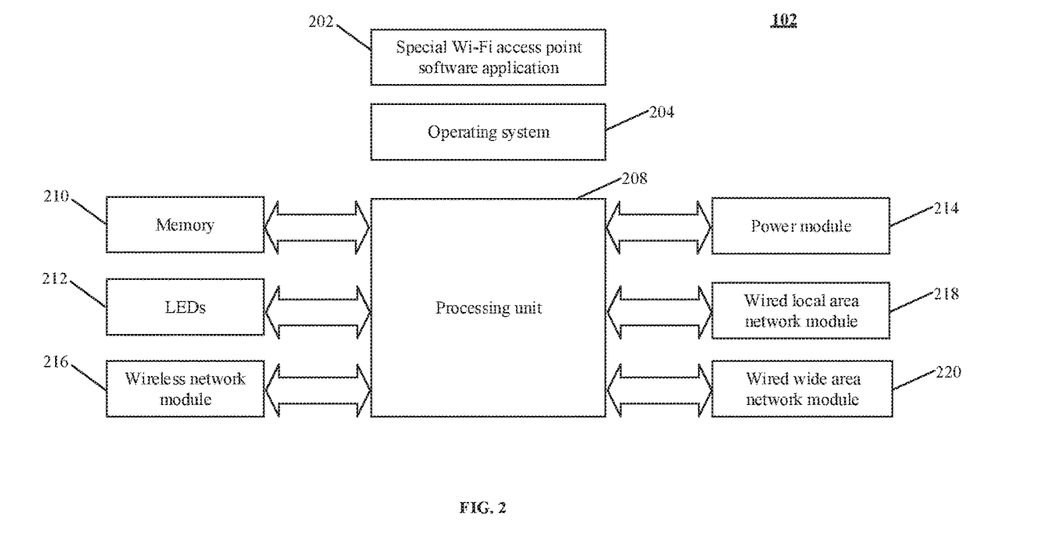
FIG. 2 is illustrative block diagram of a Wi-Fi wireless network access point in accordance with this disclosure.

The improved Wi-Fi access point 102 is further illustrated by reference to FIG. 2. Turning to FIG. 2, an illustrative block diagram of the Wi-Fi access point 102 is shown. The Wi-Fi access point 102 include a processing unit 208, some amount of memory 210 operatively coupled to the processing unit 208, a set of LED indicators 212 operatively coupled to the processing unit 208, a Wi-Fi wireless network module 216 operatively coupled to the processing unit 208, a power module 214 operatively coupled to the processing unit 208, a wired local area network module (such as Ethernet network) 218 operatively coupled to the processing unit 208, and a wired wide area network module 220 operatively coupled to the processing unit 208 for interfacing with the Internet gateway 120. The Wi-Fi access point 102 include an operating system 204, such as the LEDE/OpenWRT operating system, and Linux operating systems.

Figure 3:
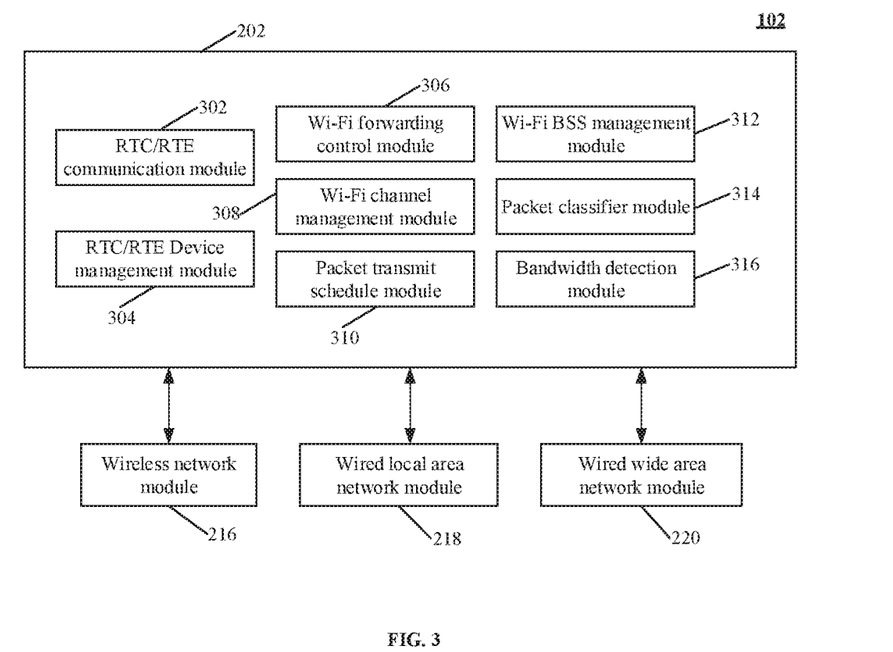
FIG. 3 is illustrative block diagram of a Wi-Fi wireless network access point in accordance with this disclosure.

The improved Wi-Fi access point 102 further includes a special Wi-Fi access point software application 202 in accordance with the present teachings. The special Wi-Fi access point software application 202 is further illustrated by reference to FIG. 3. Referring now to FIG. 3. Referring now to FIG. 6, an illustrative block diagram of the Wi-Fi access point 102 is shown. The special Wi-Fi access point software application 202 is one or more computer software programs written in one or more computer programming languages, such as C, C++, etc.

The improved Wi-Fi access point software application 202 includes an RTC/RTE communication module 302 for configuring and managing the RTC/RTE communication with the mobile devices 104-108, an RTC/RTE device management module 304 for managing the association between RTC/RTE devices and the Wi-Fi access point 102, a Wi-Fi forwarding control module 306 for priority mapping and transmitting packet based on the packet priority on the network interfaces 216-220, a Wi-Fi channel management module 308 for managing wireless communication channels and determining the optimal channels for different communication needs, a packet transmit schedule module 310 for scheduling all egress packet based on packet priority on the network interfaces 216-220, a Wi-Fi BSS management module 312 for creating and terminating BSSes, a packet classifier module 314 for configuring hardware classifier, identifying each ingress packet and setting a priority for the packet, and a bandwidth detection module 316 for determining and managing remaining bandwidth of the network interfaces 216-220.

Each of the devices 104-110 includes a processing unit, some amount of memory operatively coupled to the processing unit, a display screen operatively coupled to the processing unit, a wireless network interface operatively coupled to the processing unit and configured to communicate with the Wi-Fi access point 102, and an operating system (such as iOS, Android and Windows 10). They may each include one or more user input interfaces, such as a voice input interface, a touch panel, a mouse, a keyboard, etc. As used herein, a wireless networked device running an RTC/RTE software application is referred to as an RTC/RTE device.

Figure 4:
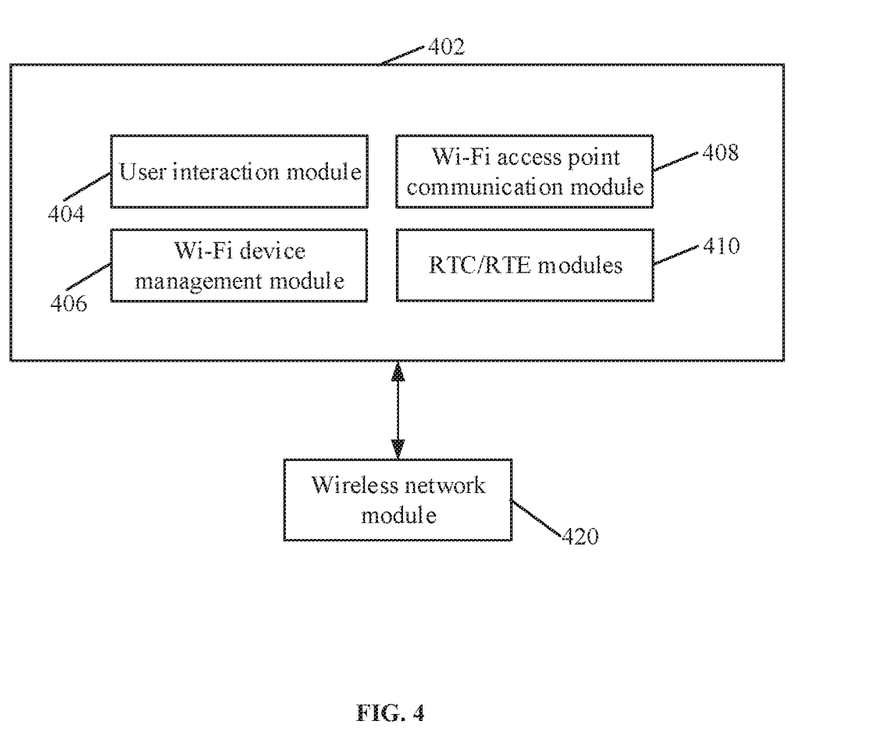
FIG. 4 is illustrative block diagram of a wireless RTC/RTE software application running on an RTC/RTE device in accordance with this disclosure.

Referring to FIG. 4, an illustrative block diagram of the RTC/RTE software application running on a mobile device (such as the electronic devices 104-110) is shown and generally indicated at 402. The special RTC/RTE software application 402 is one or more computer software programs written in one or more computer programming languages, such as C, C++, etc. The RTC/RTE application 402 communicates with the same or different RTC/RTE software applications running other remote electronic devices via the wireless network interface 420 of the mobile device. The RTC/RTE program 402 includes a set of components. In one implementation, it includes a user interaction module 404 for interacting with a user of the RTC/RTE software application 402, a Wi-Fi device management module 406 for accessing and managing the wireless network device 420, an Wi-Fi access point communication module 408 for configuring the wireless connection and exchanging data with the Wi-Fi access point 102, and one or more RTC/RTE modules 410 for providing RTC/RTE functionality, such as video and audio modules.

Interference can occur to the wireless connection between an RTC/RTE device running an RTC/RTE software application, such as the devices 104-110, and the Wi-Fi access point 102 because the air is the shared medium with other types of transmissions. The interference can be of the same frequency, i.e., co-channel, when transmissions occur on the same frequency in the same area. Interference can also occur between adjacent channels when transmissions are sent on an adjacent or partially overlapping channel. One channel bleeds over on to an overlapping channel to add noise and cause interference. When there are too many wireless devices connecting to the same wireless access point on the same channel, or too many communication applications run on a same device, the connection can become congested. In such cases, the QoE of the RTC/RTE software application would be become less desirable. The improved wireless access point 102 provides a solution to this problem.

Figure 5:
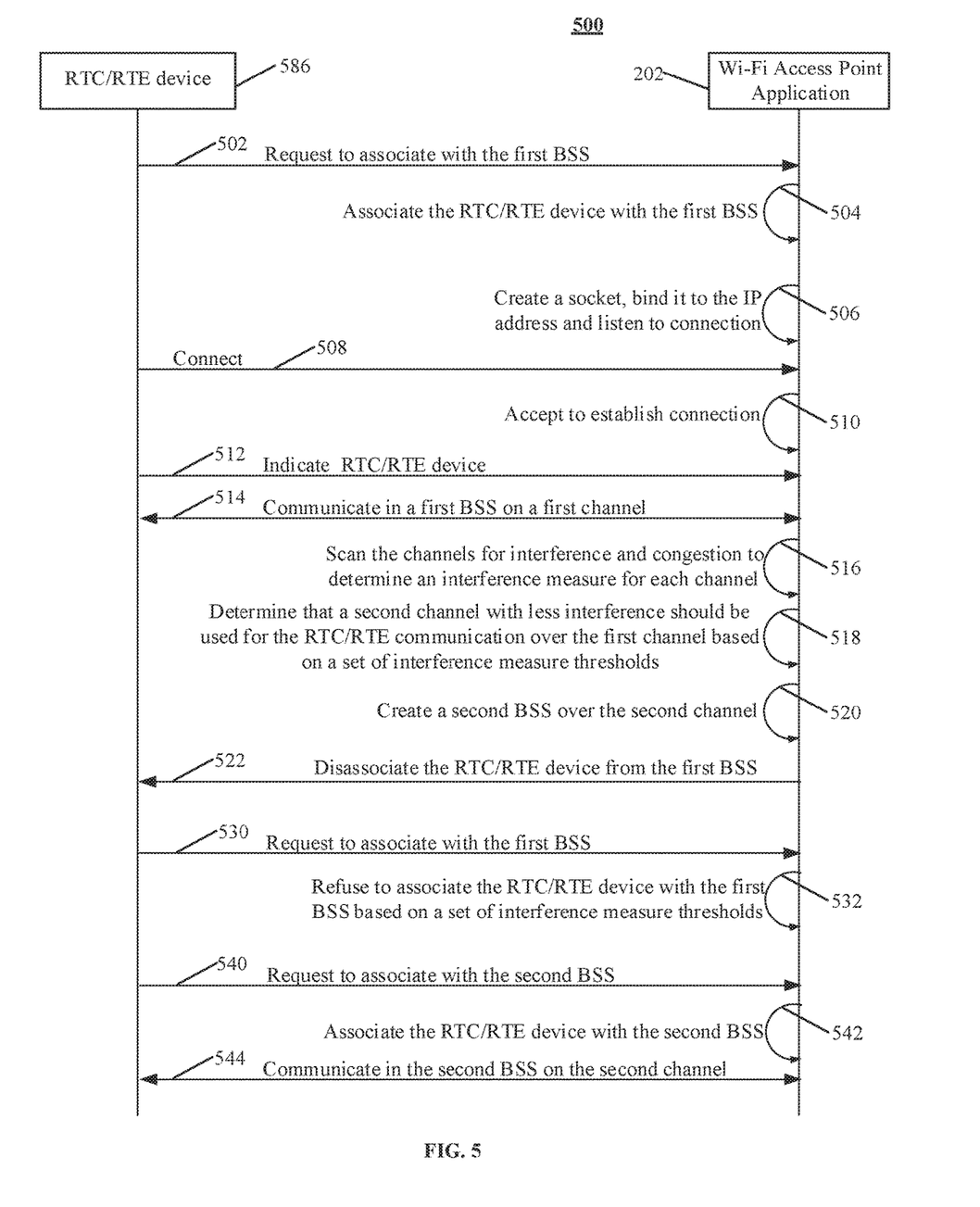
FIG. 5 is a sequence diagram illustrating the process by which a new wireless access point automatically switches an RTC/RTE device to a new BSS in accordance with this disclosure.

Referring to FIG. 5, a sequence diagram illustrating a process by which the improved wireless access point 102 automatically switches an RTC/RTE device to a new BSS to avoid wireless connection congestion and degraded RTC/RTE performance is shown and generally indicated at 500. At 502, an RTC/RTE device 586 (such as the devices 104-110) running the RTC/RTE software application 402 requests to associate with a first BSS. At 504, the access point application 202 receives the request, and associates the RTC/RTE device 586 with the first BSS over a first wireless channel. The first BSS is the present BSS on the first wireless channel over which the RTC/RTE device 586 is currently communicating with wireless access point 102.

At 506, the new access point application 202 creates a socket with a predetermined TCP port or an UDP port, binds the socket to an Internet Protocol ("IP") address of the Wi-Fi access point 102, and listens on the socket for connection requests from the RTC/RTE application 202. TCP stands for Transmission Control Protocol while UDP stands for User Datagram Protocol.

At 508, the RTC/RTE software application 402 attempts to connect to the socket. Connection request to this particular socket indicates that the software application 402 is an RTC/RTE software application and the device 586 is an RTC/RTE device. At 510, the access point application 202 accepts the connection request and establishes a connection between the special applications 202 and 402. At 512, the RTC/RTE software application 402 indicates to the wireless access point 102 that it is an RTC/RTE device, meaning a device running an RTC/RTE software application. The indication can be implied or indicated by the connection request 508 as well. Accordingly, the access point 102 now has the information that the electronic device 586 is an RTC/RTE device and indicates the same in memory. At 514, the RTC/RTE device 586 communicates with the wireless access point 102 for sending upstream data and receiving downstream data.

At 516, the wireless access point 102 scans a set of its radio channels to determine their respective level of interference and congestion. The scanning can be triggered periodically by the improved wireless access point application 202. Accordingly, it may be performed before the elements 502 and 504 when a particular RTC/RTE device associates with a particular BSS. One parameter checked by the scanning is the Signal to Noise ("SNR") parameter of the wireless channels, including the present channel. The value of the SNR parameter of each channel within the set of wireless channels is an interference measure of the corresponding wireless channel. Therefore, a set of interference measures corresponding to the set of channels is generated at 516. At 518, the wireless access point 102 determines that the interference and/or congestion in the first BSS over the first channel is too high to serve the RTC/RTE application 402 with requisite QoE, while another channel (referred to herein as the second channel) has a lower interference level by comparing the interference level of each channel against a set of interference thresholds.

For example, if the SNR of the present channel is smaller than 15 dB while the SNR of the second channel is bigger than 30 dB, at 518, the access point 102 determines that the second channel should be used for the RTC/RTE application 402. The measures 15 dB and 30 dB form the set of interference thresholds. The comparison indicates strong interference on the present channel and much less interference on the second channel. The second channel would provide much better performance for the RTC/RTE application 402. At 520, the Wi-Fi access point 102 automatically creates a new BSS over the second channel. At 522, it disassociates the RTC/RTE device 586 from the first BSS.

Furthermore, as long as the interference in the first channel is high (meaning lower SNR value based on the set of interference thresholds) and the interference in the second channel is low (meaning higher SNR value based on the set of interference thresholds), at 532, the wireless access point 102 refuses to associate the RTC/RTE device 586 with the first BSS anymore. In one implementation, the refusal is performed after the RTC/RTE device 586 requests to associate with the first BSS at 530. The association request of the element 530 is a different one from that of the element 502.

At 540, the RTC/RTE device 586 requests to associate itself with the newly created second BSS. In response to the request, at 542, the wireless access point 102 associates the RTC/RTE device 586 with the second BSS over the second channel. The switch is automatic. At 544, the RTC/RTE device communicates with the access point 102 in the new BSS on the less congested second channel. After the dynamic switch from the first BSS to the second BSS, the RTC/RTE application 402 provides a better quality of experience to its user due to less interference in the second channel.

In the second BSS, the RTC/RTE software application 402 provides higher quality of service. When the interference level in the second BSS remains low, the Wi-Fi access point may allow other RTC/RTE devices to associate with the second BSS for them to provide higher quality of service to their respective users. This process is further illustrated by reference to FIG. 6.

Figure 6:
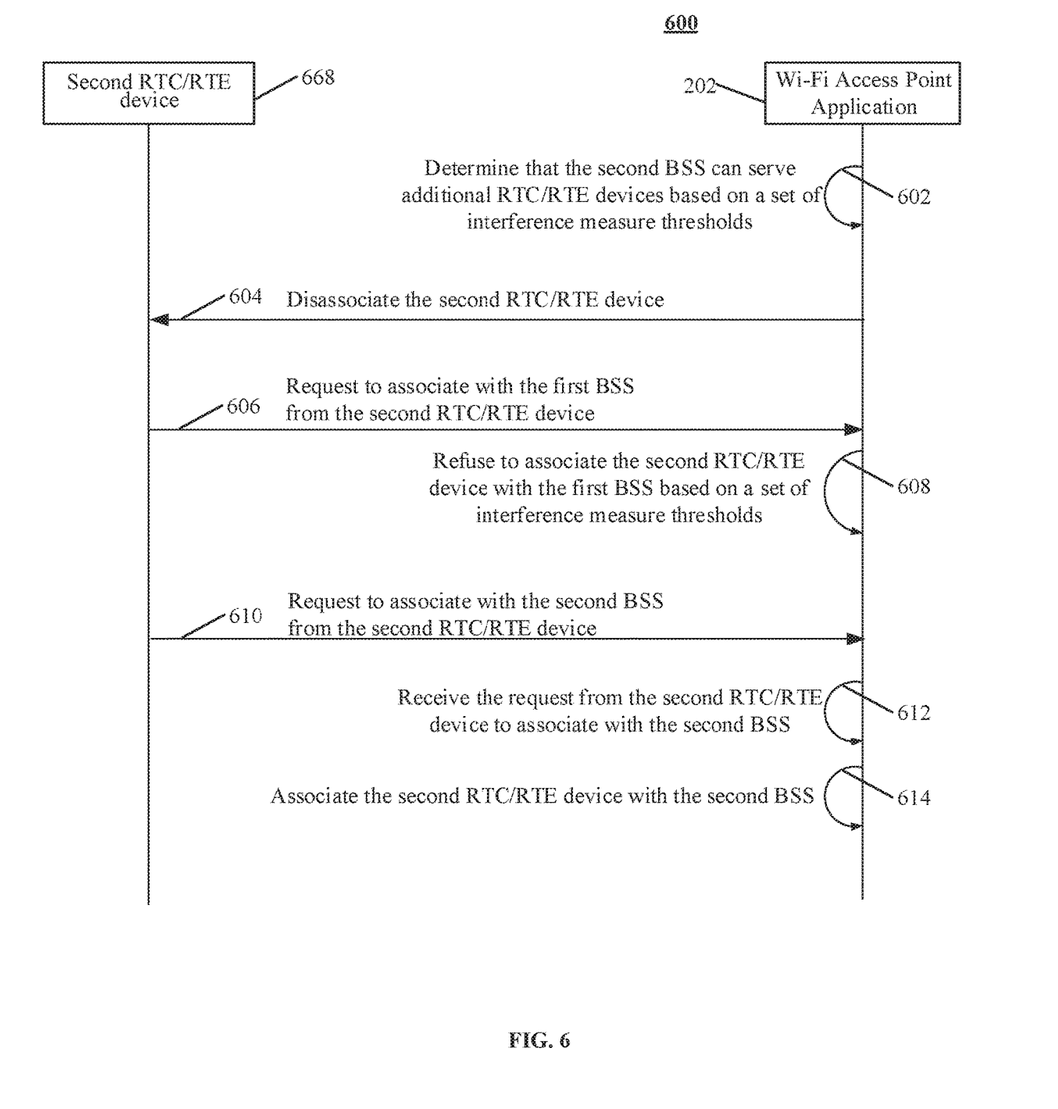
FIG. 6 is a sequence diagram illustrating the process by which a new wireless access point associates additional RTC/RTE devices with a new BSS created for serving RTC/RTE software applications in accordance with this disclosure.

Referring now to FIG. 6, a sequence diagram illustrating the process by which the improved wireless access point 102 associates an additional RTC/RTE device with the second BSS is shown and generally indicated at 600. At 602, the Wi-Fi access point 102 determines that the second BSS can serve additional RTC/RTE devices based on a set of interference thresholds while the RTC/RTE device 586 is connecting to the access point 102 over the second channel. For instance, if the SNR of the second channel is above 30 dB while the RTC/RTE device 586 is associated with the second BSS, at 602, the access point 102 determines that the interference in the second BSS is low and available free bandwidth is enough to service additional RTC/RTE device, The SNR value of 30 dB forms a set of interference measure thresholds.

At 604, the Wi-Fi access point 102 disassociates the second RTC/RTE device 668 from the first BSS. While the device 668 is associated with the first BSS, the Wi-Fi access point 102 understands that the device 668 is an RTC/RTE device. For example, the knowledge comes from the fact that the device 668 connects to the particular socket of the access point 102. At 606, the device 668 attempts to associate with the first BSS. At 608, the access point 102 refuses to associate it with the first BSS. At 610, the device 668 then attempts to associate itself with the second BSS. At 612, the access point 102 receives the request. At 614, the access point 102 associates the device 668 with the second Bss.

Figure 7:
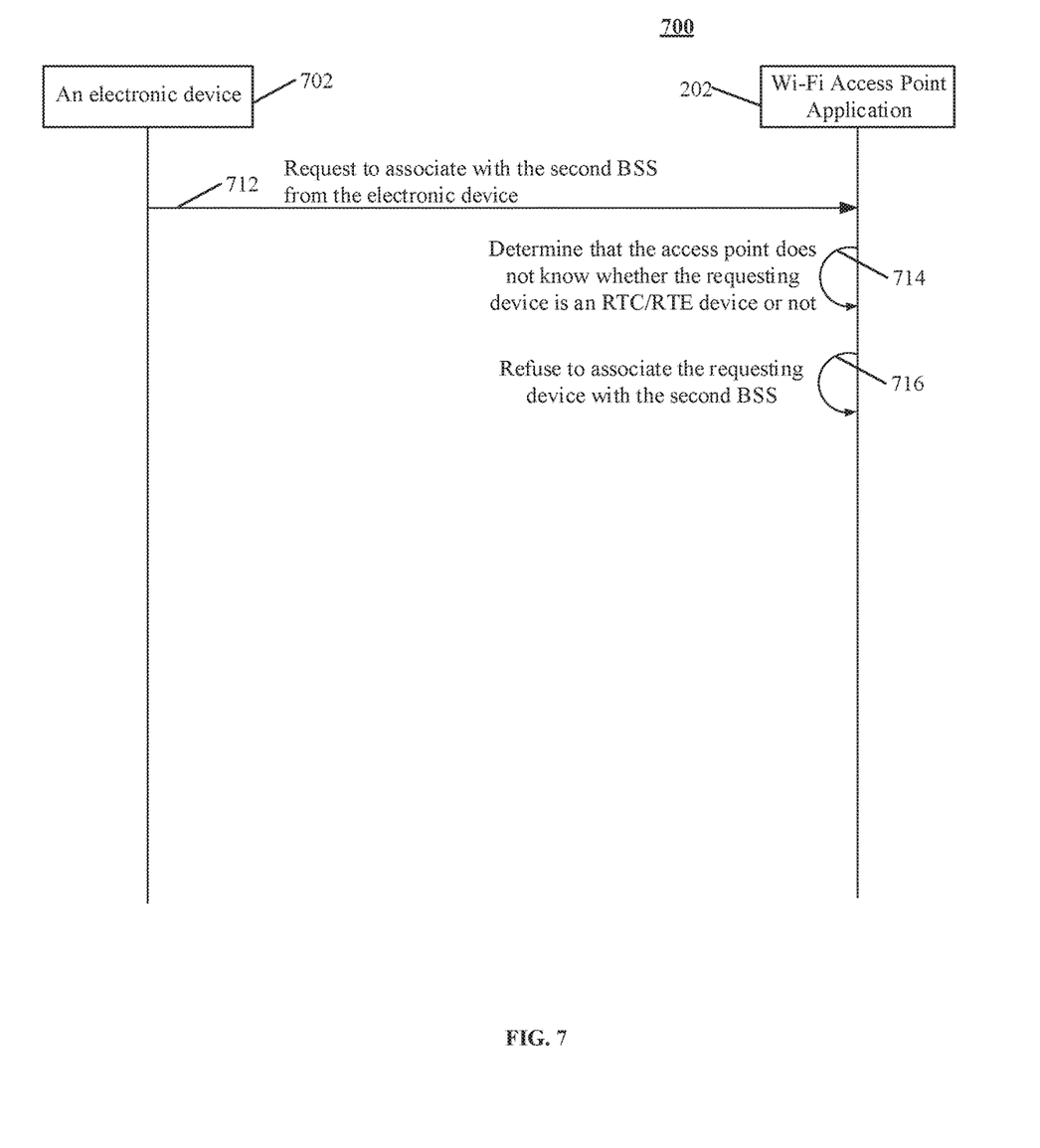
FIG. 7 is a sequence diagram illustrating the process by which a new wireless access point refuses to associate an electronic device with an RTC/RTE BSS when it does not know whether the electronic device is an RTC/RTE or not in accordance with this disclosure.

Referring to FIG. 7, a sequence diagram illustrating the process by which a new wireless access point refuses to associate an electronic device with an RTC/RTE BSS when it does not know the RTC/RTE type of the electronic device is shown and generally indicated at 700. At 712, an electronic device 702 communicates with the Wi-Fi access point 102 to associate with the second BSS. At 714, the Wi-Fi access point application determines that the RTC/RTE type of the requesting electronic device 702 is not known. In other words, the access point 102 does not understand whether the device 702 is an RTC/RTE device or not. Accordingly, at 716, the access point 102 refuses to associate the device 702 with the second BSS.

Obviously, many additional modifications and variations of the present disclosure are possible in light of the above teachings. Thus, it is to be understood that, within the scope of the appended claims, the disclosure may be practiced otherwise than is specifically described above.

The foregoing description of the disclosure has been presented for purposes of illustration and description, and is not intended to be exhaustive or to limit the disclosure to the precise form disclosed. The description was selected to best explain the principles of the present teachings and practical application of these principles to enable others skilled in the art to best utilize the disclosure in various embodiments and various modifications as are suited to the particular use contemplated. It should be recognized that the words "a" or "an" are intended to include both the singular and the plural. Conversely, any reference to plural elements shall, where appropriate, include the singular.

It is intended that the scope of the disclosure not be limited by the specification, but be defined by the claims set forth below. In addition, although narrow claims may be presented below, it should be recognized that the scope of this invention is much broader than presented by the claim (s). It is intended that broader claims will be submitted in one or more applications that claim the benefit of priority from this application. Insofar as the description above and the accompanying drawings disclose additional subject matter that is not within the scope of the claim or claims below, the additional inventions are not dedicated to the public and the right to file one or more applications to claim such additional inventions is reserved.

What is claimed is:

1. A method for automatically switching an RTC/RTE device to a new basic service set, said method performed by a wireless access point and comprising:
   1) receiving a first association request from a first RTC/RTE device for associating said first RTC/RTE device with a first BSS on a first wireless channel;
   2) in response to said first association request, associating said first RTC/RTE device with said first BSS on said first wireless channel;
   3) creating a socket with a predetermined port on an IP address of said wireless access point;
   4) receiving a request for connecting to said socket from said first RTC/RTE device;
   5) establishing a connection with said first RTC/RTE device over said socket;
   6) scanning a set of wireless channels to determine a first interference measure for each channel within said set of wireless channels, thus forming a first set of interference measures, said set of wireless channels including said first wireless channel;
   7) determining that said first interference measure of a second wireless channel within said set of wireless channels is above a first threshold within a first set of interference measure thresholds and said first interference measure of said first wireless channel is below a second threshold within said first set of interference measure thresholds;
   8) creating a second BSS on said second wireless channel;
   9) disassociating said first RTC/RTE device from said first BSS;
   10) receiving a second association request from said first RTC/RTE device to associate with said second BSS; and
   11) in response to said second association request, associating said first RTC/RTE device with said second BSS.

2. The method of claim 1 wherein said wireless access point is a Wi-Fi access point and said predetermined port is a TCP port or a UDP port.

3. The method of claim 2 wherein each interference measure within said set of interference measures is a SNR value.

4. The method of claim 3 wherein said first threshold within said first set of interference measure thresholds is different from said second threshold within said first set of interference measure thresholds.

5. The method of claim 4 further comprising:
   1) binding said socket to said IP address; and
   2) listening to said socket for connection requests from RTC/RTE devices including said first RTC/RTE device.

6. The method of claim 4 further comprising:
   1) receiving a third association request from said first RTC/RTE device for associating said first RTC/RTE device with said first BSS on said first wireless channel after said first RTC/RTE device is disassociated from said first BSS and before said first RTC/RTE device requests to associate with said second BSS; and
   2) in response to said third association request, refusing associating said first RTC/RTE device with said first BSS on said first wireless channel.

7. The method of claim 6 further comprising:
   1) scanning said set of wireless channels to determine a second interference measure for each channel within said set of wireless channels, thus forming a second set of interference measures;
   2) determining that said second interference measure of said second channel is above a first threshold within a second set of interference measure thresholds while said first RTC/RTE device is associated with said second BSS;
   3) receiving a fourth association request from a second RTC/RTE device to associate with said first BSS;
   4) in response to said fourth association request, refusing to associate said second RTC/RTE device with said first BSS;
   5) receiving a fifth association request from a second RTC/RTE device to associate with said second BSS while said first RTC/RTE device is associated with said second BSS; and
   6) in response to said fifth association request, associating said second RTC/RTE device with said second BSS while said first RTC/RTE device is associated with said second BSS.

8. The method of claim 4 further comprising:
   1) scanning said set of wireless channels to determine a second interference measure for each channel within said set of wireless channels, thus forming a second set of interference measures;
   2) determining that said second interference measure of said second channel is above a first threshold within a second set of interference measure thresholds while said first RTC/RTE device is associated with said second BSS;
3) receiving a third association request from a second RTC/RTE device to associate with said first BSS; and
4) in response to said third association request, refusing to associate said second RTC/RTE device with said first BSS
5) receiving a fourth association request from a second RTC/RTE device to associate with said second BSS while said first RTC/RTE device is associated with said second BSS; and
6) in response to said fourth association request, associating said second RTC/RTE device with said second BSS while said first RTC/RTE device is associated with said second BSS.

9. A wireless access point comprising:
1) a processing unit;
2) a memory operatively coupled to said processing unit;
3) a set of LED indicators operatively coupled to said processing unit;
4) a wireless network module operatively coupled to said processing unit;
5) a power module operatively coupled to said processing unit;
6) a wired wide area network module operatively coupled to said processing unit;
7) an operating system executed by said processing unit;
8) a wireless access point application running over said operating system; and
9) said wireless access point application adapted to:
  a) receive a first association request from a first RTC/RTE device for associating said first RTC/RTE device with a first BSS on a first wireless channel;
  b) in response to said first association request, associate said first RTC/RTE device with said first BSS on said first wireless channel;
  c) create a socket with a predetermined port on an IP address of said wireless access point;
  d) receive a request for connecting to said socket from said first RTC/RTE device;
  e) establish a connection with said first RTC/RTE device over said socket;
  f) scan a set of wireless channels to determine a first interference measure for each channel within said set of wireless channels, thus forming a first set of interference measures, said set of wireless channels including said first wireless channel;
  g) determine that said first interference measure of a second wireless channel within said set of wireless channels is above a first threshold within a first set of interference measure thresholds and said first interference measure of said first wireless channel is below a second threshold within said first set of interference measure thresholds;
  h) create a second BSS on said second wireless channel;
  i) disassociate said first RTC/RTE device from said first BSS;
  j) receive a request from said first RTC/RTE device to associate with said second BSS; and
  k) in response to said second association request, associating said first RTC/RTE device with said second BSS.

10. The wireless access point of claim 9 wherein said wireless access point is a Wi-Fi access point and said predetermined port is a TCP port or a UDP port.

11. The wireless access point of claim 10 wherein each interference measure within said set of interference measures is a SNR value.

12. The wireless access point of claim 11 wherein said first threshold within said first set of interference measure thresholds is different from said second threshold within said first set of interference measure thresholds.

13. The wireless access point of claim 12 wherein said wireless access point application is further adapted to:
1) bind said socket to said IP address; and
2) listen to said socket for connection requests from RTC/RTE devices including said first RTC/RTE device.

14. The wireless access point of claim 12 wherein said wireless access point application is further adapted to:
1) receive a third association request from said first RTC/RTE device for associating said first RTC/RTE device with said first BSS on said first wireless channel after said first RTC/RTE device is disassociated from said first BSS and before said first RTC/RTE device requests to associate with said second BSS; and
2) in response to said third association request, refuse associating said first RTC/RTE device with said first BSS on said first wireless channel.

15. The wireless access point of claim 14 wherein said wireless access point application is further adapted to:
1) scan said set of wireless channels to determine a second interference measure for each channel within said set of wireless channels, thus forming a second set of interference measures;
2) determine that said second interference measure of said second channel is above a first threshold within a second set of interference measure thresholds while said first RTC/RTE device is associated with said second BSS;
3) disassociate a second RTC/RTE device from said first BSS;
4) receive a fourth association request from said second RTC/RTE device to associate with said first BSS;
5) in response to said fourth association request, refuse to associate said second RTC/RTE device with said first BSS;
6) receive a fifth association request from a second RTC/RTE device to associate with said second BSS while said first RTC/RTE device is associated with said second BSS; and
7) in response to said fifth association request, associate said second RTC/RTE device with said second BSS while said first RTC/RTE device is associated with said second BSS.

16. The wireless access point of claim 12 wherein said wireless access point application is further adapted to:
1) scan said set of wireless channels to determine a second interference measure for each channel within said set of wireless channels, thus forming a second set of interference measures;
2) determine that said second interference measure of said second channel is above a first threshold within a second set of interference measure thresholds while said first RTC/RTE device is associated with said second BSS;
3) disassociate a second RTC/RTE device from said first BSS;
4) receive a third association request from said second RTC/RTE device to associate with said first BSS;
5) in response to said third association request, refuse to associate said second RTC/RTE device with said first BSS;

6) receive a fourth association request from a second RTC/RTE device to associate with said second BSS while said first RTC/RTE device is associated with said second BSS; and
7) in response to said fourth association request, associate said second RTC/RTE device with said second BSS while said first RTC/RTE device is associated with said second BSS.

* * * * *